(No Model.)

H. WANZER.
CORN OR COTTON TURN PLOW.

No. 578,174. Patented Mar. 2, 1897.

WITNESSES:
Otis D. Swett.
G. C. Craft.

INVENTOR
Henry Wanzer
BY Thomas P. Simpson
ATTORNEY.

UNITED STATES PATENT OFFICE.

HENRY WANZER, OF DRY GROVE, MISSISSIPPI.

CORN OR COTTON TURN-PLOW.

SPECIFICATION forming part of Letters Patent No. 578,174, dated March 2, 1897.

Application filed October 20, 1896. Serial No. 609,475. (No model.)

*To all whom it may concern:*

Be it known that I, HENRY WANZER, a citizen of the United States, residing at Dry Grove, in the county of Hinds and State of Mississippi, have invented certain new and useful Improvements in Corn and Cotton Turn-Plows; and I do declare the following to be a full, clear, and exact description of the invention, such as will enable others skilled in the art to which it appertains to make and use the same, reference being had to the accompanying drawings, and to the letters of reference marked thereon, which form a part of this specification.

The special object of the invention is to improve a turn-plow so that it may be used on the farm or plantation in the cultivation of corn or cotton, as hereinafter described.

Figure 1:
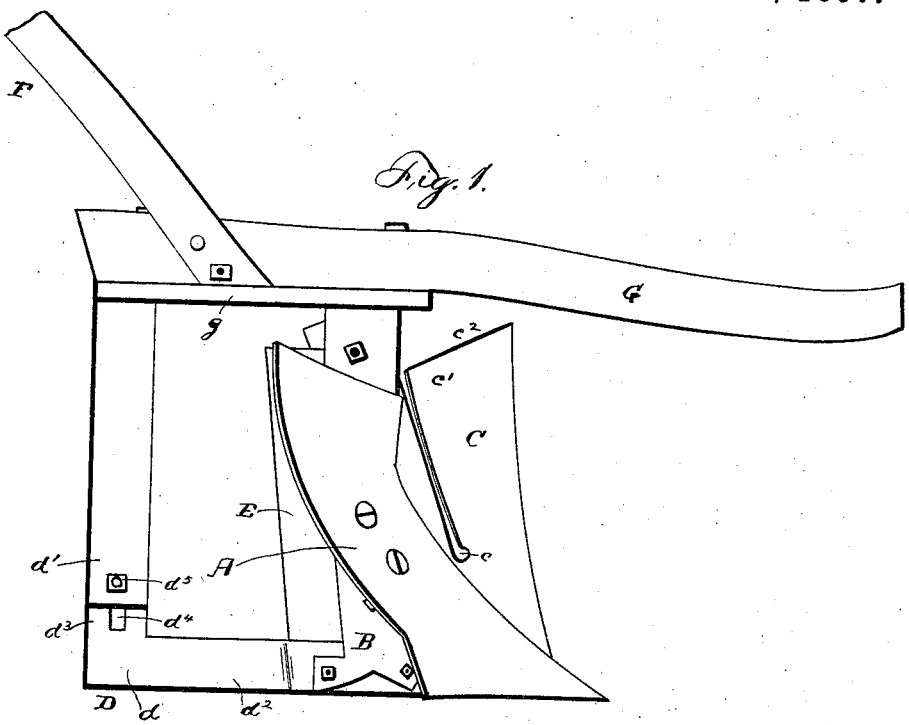
Figure 2:
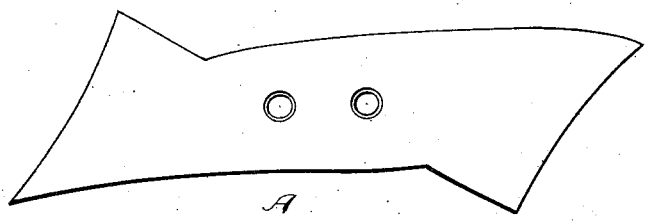
Figure 3:
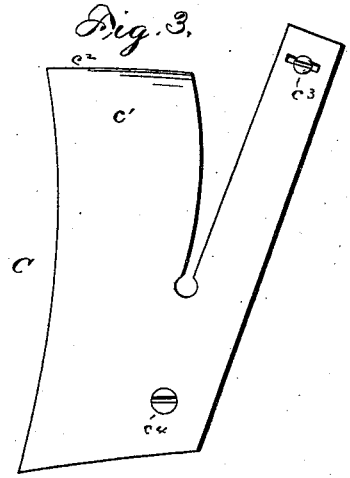
Figure 4:
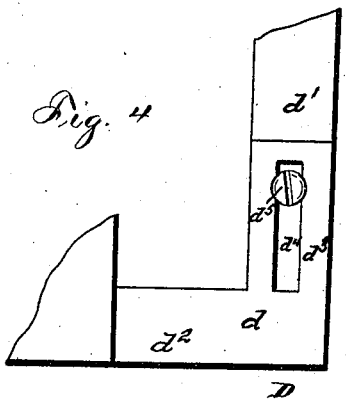

Figure 1 of the drawings is a perspective view; Fig. 2, a detail view of the reversible moldboard and share; Fig. 3, a detail view of the colter-scraper, and Fig. 4 a detail view of the heel-bar.

In the drawings, A represents the wing of the plow, which consists of a moldboard with a share at each end, the upper share always serving as a part of the moldboard in turning the soil. The moldboard will last as long as the two shares, and, being integral, they are both more easily secured to the stock B, while the share will be held more accurately in its true position.

C is the colter-scraper, which is split up from the point $c$, and the wing $c'$ bent inwardly toward the moldboard at an angle of about forty-five degrees, so as to bar off corn or cotton. Being secured to the stock merely by the two screws $c^3$ $c^4$, it may be easily put on or taken off. The upper edge $c^2$ may be bent over toward the share.

D is the heel-bar of the plow, made in the form of a right angle and in two pieces $d$ $d'$, the piece $d$ having one horizontal arm $d^2$, that runs on the bottom of furrow in the same vertical plane with the landside E, and a vertical arm $d^3$, which is provided with the slot $d^4$, while the piece $d'$ has a clamp-screw $d^5$, which enables the pitch of the plow to be accurately regulated.

F F are the handles, and G the beam, of the plow, the said beam being preferably made to rest upon a flat plate $g$, into which the stock and heel-bar are mortised, while the plate itself is bolted to the beam.

What I claim as new, and desire to protect by Letters Patent, is—

1. In a turn-plow, the scraper C split vertically to form the wing $c'$, the latter being bent on the rear edge toward the moldboard and forward on the upper edge as and for the purpose set forth.

2. In a turn-plow, the plate $g$, hanger $d'$ and right-angled heel-piece $d^2$ $d^3$ combined with the landside and plow-beam as shown and for the purpose specified.

In testimony whereof I affix my signature in presence of two witnesses.

his
    HENRY × WANZER.
        mark

Witnesses:
 S. M. HOLLINGSWORTH,
 P. E. STEWART.